US011109210B2

(12) United States Patent
Fliess et al.

(10) Patent No.: US 11,109,210 B2
(45) Date of Patent: Aug. 31, 2021

(54) FALSE POSITIVE DETECTION IN NB-IOT DOWNLINK CONTROL CHANNEL BASED ON EFFECTIVE AND SCHEDULED CODE RATE

(71) Applicant: SHENZHEN GOODIX TECHNOLOGY CO., LTD., Shenzhen (CN)

(72) Inventors: Thomas Fliess, Dresden (GE); Chethan Venkatesan, Dresden (GE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 1 day.

(21) Appl. No.: 16/868,466

(22) Filed: May 6, 2020

(65) Prior Publication Data

US 2020/0267524 A1     Aug. 20, 2020

Related U.S. Application Data

(63) Continuation of application No. PCT/CN2019/099361, filed on Aug. 6, 2019.

(30) Foreign Application Priority Data

Aug. 16, 2018    (EP) .................................... 18189316

(51) Int. Cl.
*H04W 4/00*      (2018.01)
*H04W 4/80*      (2018.01)
(Continued)

(52) U.S. Cl.
CPC ............. *H04W 4/80* (2018.02); *H04L 1/0061* (2013.01); *H04W 72/042* (2013.01); *H04W 72/0446* (2013.01); *H04W 72/14* (2013.01)

(58) Field of Classification Search
USPC ........................................................ 370/329
See application file for complete search history.

(56) References Cited

U.S. PATENT DOCUMENTS 10,773,653 B2 *   9/2020   Loew ........................ B60R 7/08
10,952,183 B2 *   3/2021   Hoglund ............ H04W 68/005
(Continued)

FOREIGN PATENT DOCUMENTS

CN         103414533 A      11/2013
CN         108234103 A       6/2018
(Continued)

OTHER PUBLICATIONS

"PDCCH False Detection for LTE-A Control Signaling", 3GPP Draft.
(Continued)

*Primary Examiner* — Marceau Milord
(74) *Attorney, Agent, or Firm* — J.C. Patents

(57) ABSTRACT

The application relates to a method for reducing false positive detection in NB-IoT downlink control channel. The method comprises the following steps: synchronizing a UE to an eNB and exchanging a data transmission via a NPDSCH or a NPUSCH, whereas DCI pertaining to downlink or uplink data transmission is signaled to UE by eNB via NPDCCH, wherein calculating an effective code rate of NPDCCH that is used in receiving downlink grant, resulting in a value $CR_{NPDCCH}$, calculating a scheduled code rate of NPDSCH or NPUSCH, resulting in a value $CR_{NPDSCH}$ or $CR_{NPUSCH}$, calculating a ratio between the effective code rate $CR_{NPDCCH}$ and the scheduled code rate $CR_{NPDSCH}$ or $CR_{NPUSCH}$, resulting in a result x, comparing the result x with pre-defined upper and lower bounds, dropping and not processing further the result x as false positive detection if the result x violates the pre-defined bounds.

20 Claims, 3 Drawing Sheets

(51) Int. Cl.
  *H04L 1/00* (2006.01)
  *H04W 72/04* (2009.01)
  *H04W 72/14* (2009.01)

(56) References Cited

U.S. PATENT DOCUMENTS

| | | | |
|---|---|---|---|
| 10,965,430 B2* | 3/2021 | Hwang | H04L 5/001 |
| 11,026,266 B2* | 6/2021 | Kurth | H04W 72/042 |
| 11,039,460 B2* | 6/2021 | Shin | H04L 5/00 |
| 2016/0057776 A1 | 2/2016 | Farkas | |
| 2017/0324587 A1* | 11/2017 | Lin | H04L 27/2675 |
| 2018/0270839 A1* | 9/2018 | Loehr | H04W 72/0446 |
| 2018/0310308 A1* | 10/2018 | Loehr | H04W 72/1242 |
| 2019/0098657 A1* | 3/2019 | Golitschek Edler Von Elbwart et al. | H04W 72/1284 |
| 2019/0174341 A1* | 6/2019 | Chincholi | H04W 24/10 |
| 2019/0174466 A1* | 6/2019 | Zhang | H04L 5/0048 |
| 2019/0222400 A1* | 7/2019 | Bagheri | H04L 5/0053 |
| 2019/0239189 A1* | 8/2019 | Hwang | H04W 52/0229 |
| 2019/0254013 A1* | 8/2019 | Chang | H04L 5/00 |
| 2019/0281587 A1* | 9/2019 | Zhang | H04L 5/0053 |
| 2020/0045706 A1* | 2/2020 | Shin | H04L 1/1822 |
| 2020/0053757 A1* | 2/2020 | Bagheri | H04W 72/042 |
| 2020/0383119 A1* | 12/2020 | Sun | H04L 5/0092 |

FOREIGN PATENT DOCUMENTS

| | | |
|---|---|---|
| CN | 108352953 A | 7/2018 |
| EP | 2166804 A | 3/2010 |
| WO | WO2010127295 A1 | 11/2010 |

OTHER PUBLICATIONS

Summary of [91-LTE-10], 3GPP Draft.
Extended European search report.
International Search Report.

* cited by examiner

FALSE POSITIVE DETECTION IN NB-IOT DOWNLINK CONTROL CHANNEL BASED ON EFFECTIVE AND SCHEDULED CODE RATE

CROSS-REFERENCES TO RELATED APPLICATIONS

This application is a continuation of International Application No. PCT/CN2019/099361, filed on Aug. 6, 2019, which claims priority to EP application EP18189316.5, filed on Aug. 16, 2018. The disclosures of the aforementioned applications are hereby incorporated by reference in their entireties.

TECHNICAL FIELD

The application relates to a method for reducing false positive detection in NB-IoT downlink control channel.

BACKGROUND

New markets and techniques for e.g. internet-of-things (IoT) are currently being developed; new applications like automatic meter reading from the outside of buildings via cellular networks emerge.

On one hand, such applications demand increase in coverage of the cellular networks. On the other hand, network operators are not willing to spend too much frequency spectrum as highly valuable resource and device manufacturers want to reduce costs for such IoT devices which are produced in potentially high volumes.

To meet these requirements, narrowband IoT standard (NB-IoT) is developed as a derivative of the long-term evolution standard (LTE) where the maximum bandwidth is very small compared to other cellular systems.

To achieve high coverage while being constraint by heavy limitations of the system bandwidth, repetition and combining is widely deployed throughout NB-IoT standard. Repetition and combining is a widely-used technique where signals or information are repeated on the transmitter side. This allows the receiver to combine received signals or information to obtain a more reliable result, e.g. during detection of a signal or decoding of information conveyed in a certain channel.

A characteristic of transmissions with repetitions is so-called code rate, i.e. the ratio of number of information bits per transmission and the number of channel bits being transmitted. The lower code rate gets the more reliable the transmission becomes. Hence, the code rate in the sense of this application will be understood as the ratio of number of information bits per transmission and the number of channel bits being transmitted.

In cellular communication, the scheduling information of the downlink or uplink data on the data channel is signaled in a so-called Narrowband physical downlink control channel (NPDCCH) where all the user equipments (UE) connected to the base stations (eNB) of the network can tune in. Particular NPDCCHs are used to signal the presence and parameters of user data transmissions from eNB to a certain UE or the availability of time/frequency resources and other parameters for transmissions from a certain UE to eNB. This set of parameters is called downlink control information (DCI).

Scheduling of NPDCCH transmissions are organized in so-called search spaces, where each search space comprises multiple NPDCCH candidates, i.e. time/frequency resources individual NPDCCHs can be mapped onto (see FIG. 1). A user equipment will be configured by a base station to continuously monitor a particular search space. However, an actual NPDCCH dedicated to that UE will only be present in one of the candidates of the search space when higher layer data have to be transferred. In all other cases, the monitored candidates and their associated time/frequency resources may contain NPDCCHs dedicated to other UEs attached to the same base station, interference signals from other base stations using the same frequency range or no useful signal at all. The method of monitoring, i.e. attempting to decode certain candidates without knowing whether a signal dedicated to the UE is present or not is called "blind search".

In the downlink processing chain of NPDCCH on base station side, each transport block is cyclic redundancy check (CRC) bits attached and scrambled with the Radio Network Temporary Identifier (RNTI) of the UE, is channel coded and rate-matched. The rate matched block is scrambled, modulated and mapped to a subframe according to aggregation and repetition level of the NPDCCH candidate. These steps are explained in more detail.

The "CRC calculation" refers to a procedure where payload bits are fed into a shift register with linear feedback in order to create a checksum which can be used to determine correctness of the received data. This checksum is usually appended to the sequence of payload bits. CRC means cyclic redundancy check. Payload bits are understood as a NPDCCH transport block also known as NPDCCH payload bits contains downlink control information.

The "Convolutional encoding" refers to encoding of payload data and attached CRC bits according to a linear scheme. For encoding of NPDCCH and other channels in NB-IoT, coding schemes with code-rate 1/3 are used, i.e. each input bit to the encoder creates 3 bits in the output of the encoder. This additional redundancy may be used at receiver side to compensate for channel distortions and errors in the received signal.

The "Rate matching" describes a procedure where the base code rate of the used code (in general 1/3) is adapted to the desired amount of redundancy, i.e. the level of protection of the transmitted signal. Furthermore, rate matching is used to adapt the output of the convolutional encoder's bit stream to the number of available resources given by the structure of the transmitted signal in a fine-granular fashion, hence by the convolutional encoding to encode payload data and attached CRC bits according to a linear scheme. During the rate matching procedure, individual bits are either repeated or omitted while assembling the output bit stream, to get a higher or lower amount of redundancy, respectively. Furthermore, rate matching in NB-IoT involves some interleaving, i.e. exchange of bit positions to improve diversity. All operations are linear. On receiver side, so called de-rate matching involves combination of bits that have been repeatedly transmitted or filling of bit positions that have been omitted in the actual transmission with zero information.

The "Scrambling" describes a procedure where a locally generated pseudo-random bit sequence is applied to an input bit stream by a bit-wise xor-operation. This improves the statistics of the transmitted signal since long sequences of '0' or '1' are avoided. Furthermore, interference from or to other transmission links becomes more noise-like, improving the ability to cope with such interferences during decoding. Both, transmitter on the base station side and receiver on the UE side apply the same pseudo-random sequence, which depends on cell identifier and subframe number; the xor operation itself is linear. In order to allow for reception of NPDCCH under extreme conditions (e.g. high attenuation in basements of buildings), NPDCCH can be transmitted in repetitions which a UE may collect and combine to successfully decode DCI conveyed in NPDCCH. Repetition means that the same DCI is transmitted from eNB in multiple consecutive subframes, allowing UE to collect and combine received signals before attempting to decode DCI.

Same or similar encoding schemes apply to other channels in NB-IoT as well, like Narrowband physical downlink shared channel (NPDSCH) and Narrowband physical uplink shared channel (NPUSCH). The NPDSCH and NPUSCH transmit the data that has to be transferred to or from the UE from or to the base station.

The following variable parameters determine the code rate of the NPDCCH:
  Number of bits in downlink control information (DCI)
  Number of QAM symbols per subframe available for NPDCCH
  Number of repetitions of a particular NPDCCH The following variable parameters determine the code rate of the NPDSCH:
  Length of downlink(DL) payload information
  Number of QAM symbols per subframe available for NPDSCH
  Number of subframes an NPDSCH is mapped onto
  Number of repetitions The following variable parameters determine the code rate of the NPUSCH:
  Length of uplink (UL) payload information
  Number of bits per QAM symbol
  Number of symbols per so-called resource unit
  Number of resource units an NPUSCH is mapped onto
  Number of repetitions.

With respect to reliability of any kind of transmission between eNB and UE or vice a versa, low code rate is always beneficial. However, assuming a fixed length of payload information, the amount of required radio resources (occupied time/frequency resources) increases when lowering the code rate. For instance, the total duration of a transmission increases, yielding higher power consumption especially on UE side. Furthermore, time/frequency resources occupied by a transmission to or from one UE cannot be used for transmissions to or from other UEs. Thus, the total cell capacity, i.e. data rate available for all UEs within a cell, shrinks with lower code rates. On top, the longer a transmission lasts, the more interference to other cells in the proximity is created. Hence, the network will always try to balance reliability of a transmission and the amount of allocated radio resources, i.e. code rate, to it. This applies to all Narrowband unicast channels, i.e. NPDCCH, NPDSCH, and NPUSCH.

UE decodes the downlink control information (DCI) by performing blind search within the search space by monitoring multiple candidates represented by aggregation and repetition. A NPDCCH search space contains multiple NPDCCH subframes with an upper limit of $R_{max}$.

A NPDCCH is transmitted on an aggregation of one or two consecutive narrowband control channel elements (NCCEs), where a narrowband control channel element corresponds to six consecutive subcarriers in a subframe where NCCE 0 occupies subcarriers 0 through 5 and NCCE 1 occupies subcarriers 6 through 11. Depending upon the coverage level, the subframes can be repeated multiple times [3GPP TS 36.213].

In the downlink processing chain of NPDCCH on eNB side, DCI is mapped to a NPDCCH transport block which is protected by a cyclic redundancy check (CRC) of length 16 whose bits are attached to the transport block and transmitted along with the actual DCI.

A false positive detection in NPDCCH occurs when the CRC check passes even if the monitored NPDCCH candidate did not contain a DCI dedicated to the UE. This can happen when erroneous bits in combination with unaltered bits passes a CRC check or decoding result from plain noise accidentally forms a transport block with matching CRC bits.

The 16-bit CRC attachment in NPDCCH can yield a false positive rate of $2^{-16}$. In low signal-to-noise ratio (SNR) conditions, the chances of false positives are high with increasing NPDCCH decoding trials. False NPDCCH positives can have serious consequences such as misdetection of uplink (UL) and downlink (DL) scheduling, thus increasing retransmissions. This leads to reduction in throughput and increase in power consumption of the UE. Detection and mitigation of false positives on downlink control channels are essential in power critical NB-IoT systems.

SUMMARY

It is therefore the object of the application to find a method that allows a reliable false positive detection of the reception of NPDCCH to a UE that is not dedicated to said UE in order to avoid mismatching of UL and DL scheduling and increasing transmission needs and hence in order to increase the throughput and to reduce the power consumption of the UE.

The object of the application will be solved by a method for reducing false positive detection in NB-IoT downlink control channel, the method comprising the following steps:
  synchronizing a user equipment (UE) to a base station (eNB) and exchanging a data transmission via a narrowband physical downlink shared channel (NPDSCH) or a narrowband physical uplink shared channel (NPUSCH), whereas downlink control information (DCI) pertaining to downlink or uplink data transmission is signaled to UE by the base station via narrowband physical downlink control channel (NPDCCH), wherein
  calculating an effective code rate of NPDCCH that is used in receiving downlink grant, resulting in a value $CR_{NPDCCH}$,
  calculating a scheduled code rate of NPDSCH or NPUSCH, resulting in a value $CR_{NPDSCH}$ or $CR_{NPUSCH}$,
  calculating a ratio between the effective code rate $CR_{NPDCCH}$ and the scheduled code rate $CR_{NPDSCH}$ or $CR_{NPUSCH}$, resulting in a result x,
  comparing the result x with pre-defined upper and lower bounds,
  dropping and not processing further the result x as false positive detection if the result x violates the pre-defined bounds.

BRIEF DESCRIPTION OF DRAWINGS

The application will be described in more detail using exemplary embodiments shown in the drawings.

DESCRIPTION OF EMBODIMENTS

Figure 1:
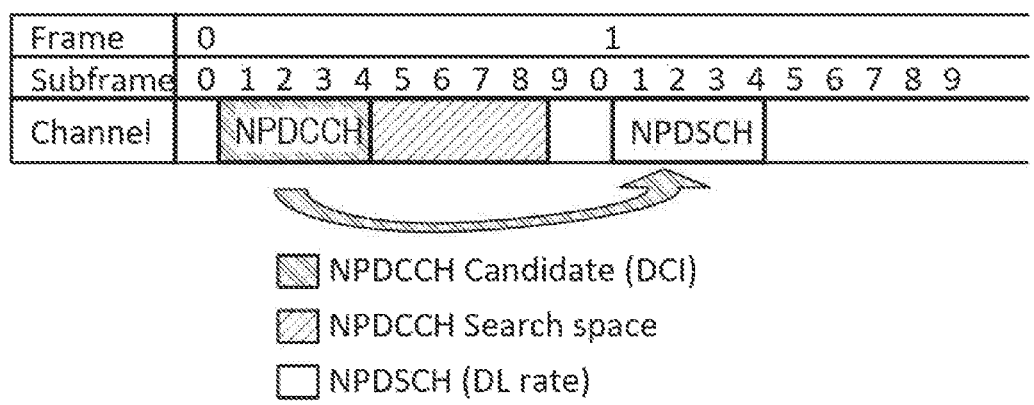
FIG. 1 shows scheduling of NPDCCH and NPDSCH.

Existing channel conditions between a base station (eNB) and a user equipment (UE) determine which code rate is needed to achieve a certain error rate for transmissions between the UE and the eNB. The eNB will adjust resource allocation and other parameters for channels NPDCCH, NPDSCH, and NPUSCH according to their individual error rate targets in order to balance between the level of protection of a transmission and required radio resources as well as power consumption. The calculations of the effective and scheduled code rate are performed by the modem of the UE.

In an embodiment of the inventive method, the effective code rate inherently represents channel conditions between UE and the base station and is determined by $CR_{NPDCCH}=N_I/(R*N)$, where $N_I=23$ or 24 bits and N is the number of code bits mapped to a single subframe and R is the number of repetitions of a resource mapped subframe. It is assumed that effective code rate of the NPDCCH channel (as represented by the number of repetitions) to successfully decode true NPDCCH transmissions inherently represents the channel conditions between UE and eNB. The resource mapped subframe is repeated for R repetitions based on the chosen candidate. Repetition level of candidate is chosen by eNB based on the channel conditions to ensure successful decoding in the UE as well as minimum radio resource utilization. The code rate of the overall NPDCCH candidate is thus determined by $CR_{NPDCCH}=N_I/(R*N)$ as claimed.

In a further embodiment of the inventive method, the scheduled code rate of NPDSCH is indicated by downlink control information (DCI) and is determined by $CR_{NPDSCH}=N_I/(N*N_{SF}*N_{Rep})$, where $N_I$ represents a transport block size NPDSCH given by modulation and coding scheme extracted from the DCI payload, N is the number of code bits mapped to a single subframe, $N_{SF}$ represents the number of subframes that the code word is rate-mapped to and $N_{Rep}$ represents the number of repetitions of the rate-mapped number of subframes. It is assumed that the scheduled code rate of NPDSCH transmissions indicated by the DCI carried in the received NPDCCH are similarly adjusted to the existing channel conditions which can be checked based on the information given in the DCI. Hence, the scheduled code rate and effective code rate during reception is comparable.

In a preferred embodiment of the inventive method, the scheduled code rate of NPUSCH is indicated by downlink control information (DCI) and is determined by $CR_{NPUSCH}=N_I/(N*N_{RU}*N_{Rep})$, where $N_I$ represents a transport block size NPUSCH given by modulation and coding scheme extracted from the DCI payload, N is the number of code bits mapped to a resource unit, $N_{RU}$ represents the number of resource units that the code word is rate-mapped to and $N_{Rep}$ represents the number of repetitions of the rate-mapped number of resource units. It is assumed that the scheduled code rate of NPUSCH transmissions indicated by the DCI carried in the received NPDCCH are similarly adjusted to the existing channel conditions which can be checked based on the information given in the DCI. Hence, the scheduled code rate and effective code rate during reception is comparable.

These assumptions are not necessarily true for false positives detections occurring after NPDCCH decoding since the decoded DCI does not originate from a meaningful eNB transmission but from a random process, e.g. thermal noise or interference from another cell.

The code rate of the subsequent NPDSCH or NPUSCH can be derived by the UE from the information present within the DCI. The processing order of NPDSCH in the transmitter of the UE is the same as for NPDCCH. The parameters "resource assignment" and "repetition number" are extracted from the DCI payload and mapped to relevant values $N_{SF}$ and $N_{Rep}$ as defined in 3GPP 36.213. Additionally, "modulation and coding scheme" is extracted from DCI.

A central idea of the application is to check the ratio of effective and scheduled code rate of NPDCCH decoding trials with a successful CRC check. If the ratio exceeds an upper bound or falls below a lower bound, the decoding trial can be deemed as false positive. Thus, a significant portion of false positive NPDCCH detections can be filtered out.

Hence, in a preferred embodiment of the inventive method the upper bound is defined by an adjusted and optimized value based on field experience.

And in another preferred embodiment of the inventive method, the lower bound is defined by an adjusted and optimized value based on field experience.

Field experience in the sense of this application means that a method is performed in order to set lower and upper bounds, whereas the method is basically performed in two parts: In an initial part, an initial conservative setting shall be used. This means that the upper and lower bound can be set to 400%/25% of the nominal code rate. To generalize, this corresponds to the widest possible false positive filter. Thereby, the nominal code rate is defined as the code rate required to achieve 10% BLER (BLER=block error rate).

In a second part or so-called refinement/adaptive part, methods of refinement are performed, such as an adaptive scheme is performed where, on a verification of a true grant by the UE, the UE modifies upper/lower bound as explained later or a self-learning algorithm of the UE in the field will be performed.

In an embodiment of the inventive method, the DCI is a NPDCCH payload and carries configuration parameters of NPDSCH or NPUSCH such as modulation scheme, coding scheme, resource assignment and repetition number. For example, in 3GPP release 13 the length of DCI is 23 bits and in 3GPP release 14 the length of DCI is 23 or 24 bits.

A wrongly decoded downlink commands the UE to receive NPDSCH for a period of time where eNB does not transmit NPDSCH for that UE, wasting battery energy during that time. Furthermore, the UE has to respond with a "not acknowledged" in uplink direction, which may be even more power consuming.

Finally, the eNB may send a true NPDCCH to the UE while the latter is still trying to receive the non-existent NPDSCH. That true grant is not received and eNB has to retry at a later point in time, wasting radio resources and reducing cell capacity.

The same applies to the uplink direction. A wrongly decoded uplink grant commands the UE to assemble an UL data packet on higher layer side and to transmit it via NPUSCH. This transmission will be lost since eNB is not expecting an NPUSCH transmission from the UE. This slows down the protocol on higher layer side since a missing packet has to be detected and transmitted later on. On physical layer, the wrongly decoded UL grant immediately leads to waste of energy but may also cause interference to other UEs.

Hence, the proposed method reduces the number of false positives after NPDCCH decoding, prevents usage of wrong UL or DL grants and avoids or limits the negative impacts mentioned above.

In a further preferred embodiment of the inventive method, the upper and lower bounds are refined by self-learning of the UE in field. Self-learning may be based on machine learning aspects. One of the inputs to the machine learning technique is the statistics of successful transmissions/receptions.

The proposed strategy can be extended by an adaptive part where the modem of the UE starts from wide bounds for true grants, i.e. from a state where only a few false positive grants are rejected. Once grants are verified to be correct, e.g. via positive CRC result after NPDSCH reception, their parametrization may be used to refine the bounds such that a higher number of false positive grants are rejected subsequently. Hence, the filtering happens by increasing the lower bound and by decreasing the upper bound.

In another preferred embodiment of the inventive method, the DCI is a NPDCCH payload that is 23 or 24 bits long and carries configuration parameters of NPDSCH or NPUSCH such as modulation scheme, coding scheme, resource assignment and repetition number.

In NB-IoT network, a user equipment must synchronize to a cell and acquire basic information, attach to the cell and start the data transfer. During this process, information is exchanged between UE and eNB via downlink NPDSCH and uplink NPUSCH channels. The downlink control information pertaining to uplink (DCI Format N0) and downlink (DCI Format N1) data transmission is signaled to UE by eNB via NPDCCH.

DCI as NPDCCH payload is 23 or 24 bits long and carries the configuration parameters of downlink/uplink data channels such as modulation and coding scheme, resource assignment, repetition number etc.

Figure 2:
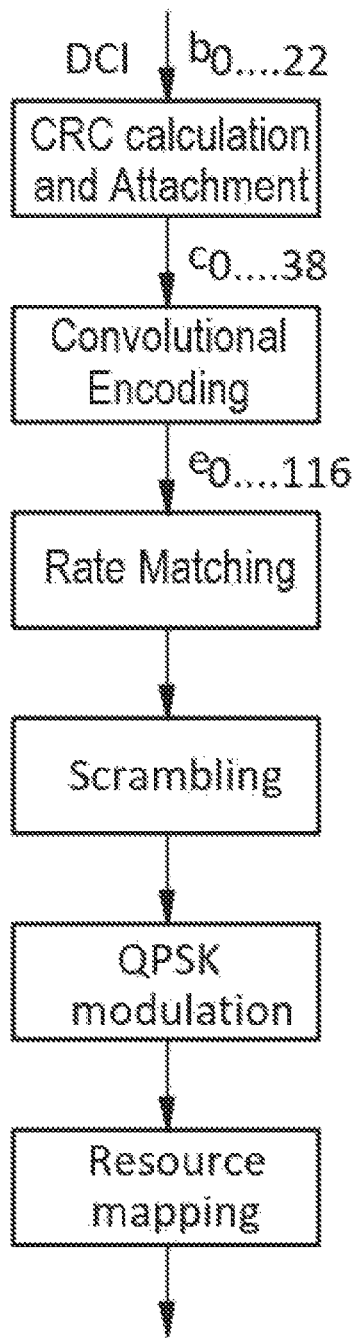
FIG. 2 shows a processing procedure of NPDCCH in a downlink transmitter.

As per 3GPP 36.211 and 36.212 defined, the processing of NPDCCH on the transmitter can be summarized as follows:

Firstly, a 16-bit CRC checksum is calculated and attached to the transport block with payload bits, resulting in a bit sequence $\{c_i\}$ with $\{c_0 \ldots c_{38}\}=\{b_0 \ldots b_{22}, crc_0 \ldots crc_{15}\}$, where $b_i$ represent the payload bits of a transport block and $crc_i$ represent the attached CRC checksum. Secondly, the bit sequence $\{c_i\}$ is convolutional encoded by tail-biting, resulting in a second bit sequence $\{e_i\}$ with $\{e_0 \ldots e_{116}\}$. The second bit sequence is rate matched to the size of a single subframe, scrambled, Quadrature Phase Shift Keying (QPSK) mapped and resource mapped. This described procedure is schematically shown in FIG. 2.

Afterwards, the resource mapped subframe is repeated for R repetitions based on the chosen candidate. Repetition level of candidate is chosen by eNB based on the channel conditions to ensure successful decoding in the UE as well as minimum radio resource utilization. The code rate of the overall NPDCCH candidate is thus determined by $CR_{NPDCCH}=N_I/(R*N)$, where $N_I$=23 or 24 bits and N is the number of code bits mapped to a single subframe.

The code rate of the subsequent NPDSCH or NPUSCH can be derived by the UE from the information present within the DCI. The processing order of NPDSCH in the transmitter is the same as for NPDCCH. The parameters "resource assignment" and "repetition number" are extracted from the DCI payload and mapped to relevant values $N_{SF}$ and $N_{Rep}$ as defined in 3GPP 36.213. $N_{SF}$ represents the number of subframes that the code word is rate-matched to. $N_{Rep}$ represents the number of repetitions of the entire rate-matched sequence. Additionally, "modulation and coding scheme" is extracted from DCI. The scheduled code rate of the NPDSCH is thus determined by $CR_{NPDSCH}=N_I/(N*N_{SF}*N_{Rep})$, where $N_I$ is the transport block size NPDSCH given by modulation and coding scheme and N is the number of code bits mapped to a single subframe. As stated above, similar calculation can be employed to uplink data channel (NPUSCH) to determine the code rate $CR_{NPUSCH}$.

Figure 3:
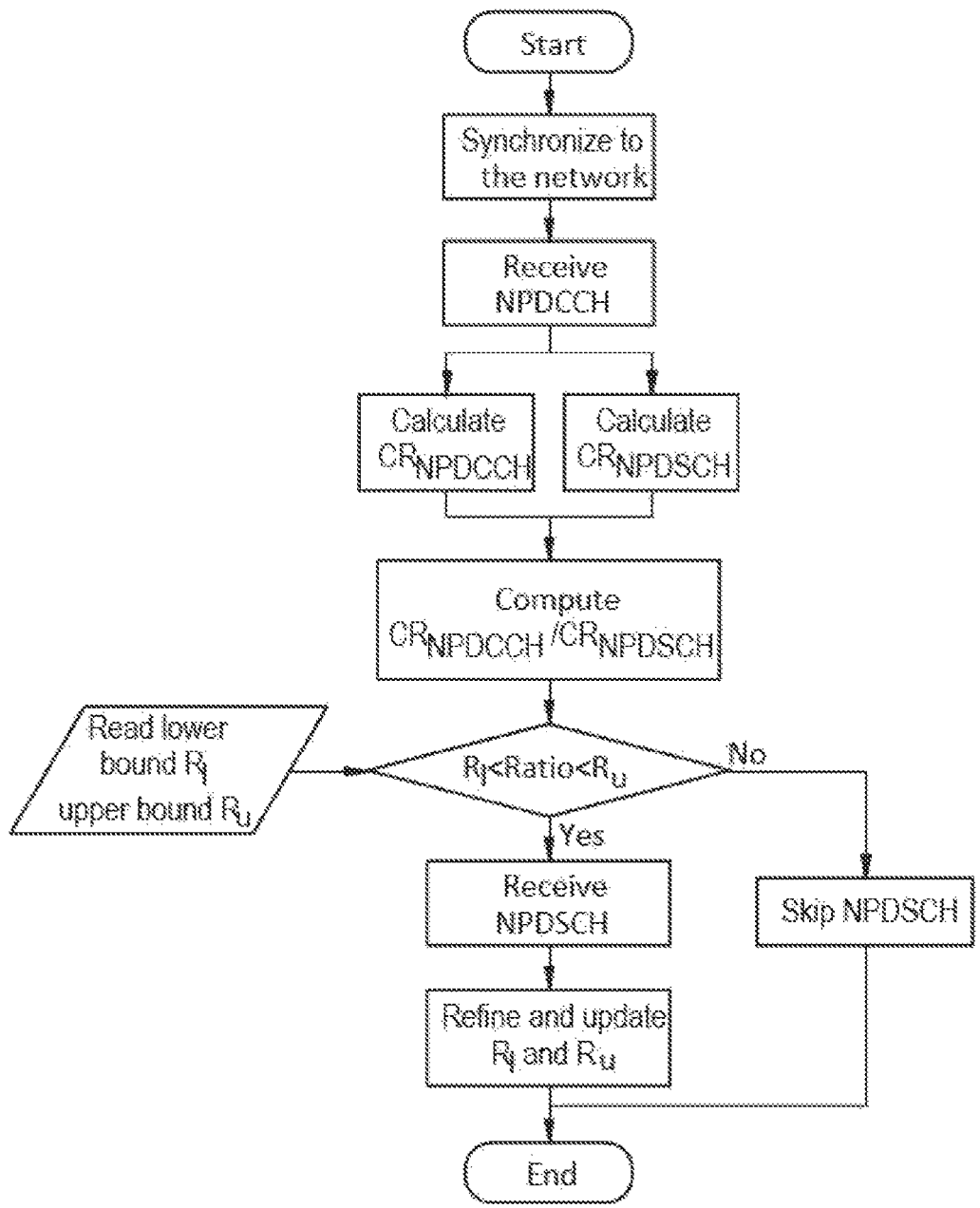
FIG. 3 shows a flowchart showing the method according to the application.

In order to determine the NPDCCH false positive, the following steps have to be performed as shown schematically in FIG. 3:
1. Calculate the effective code rate of NPDCCH ($CR_{NPDCCH}$) used in receiving downlink grant;
2. Calculate the scheduled code rate of NPDSCH ($CR_{NPDSCH}$) or NPUSCH ($CR_{NPUSCH}$);
3. Calculate the ratio between the calculated code rates and compare the result with upper and lower bounds;
4. Grants where the code rate ratio violates the predefined bounds are considered as false positives, dropped and not processed further.

The proposed strategy can be used in any 3GPP system involving resource allocation by a base station with a blind decoding in UE with limited CRC bits, for examples: NB-IoT, Cat-M, LTE.

The proposed strategy can be extended by an adaptive part where the modem starts from wide bounds for true grants, i.e. from a state where only a few false positive grants are rejected. Once grants are verified to be correct, e.g. via positive CRC result after NPDSCH reception, their parametrization may be used to refine the bounds such that a higher number of false positive grants are rejected subsequently.

What is claimed is:

1. A method for reducing false positive detection in a narrowband internet-of-things (NB-IoT) downlink control channel, the method comprising the following steps:
   synchronizing user equipment (UE) to a base station and exchanging a data transmission via a downlink narrowband physical downlink shared channel (NPDSCH) or an uplink narrowband physical uplink shared channel (NPUSCH), whereas downlink control information (DCI) pertaining to downlink or uplink data transmission is signaled to the UE by the base station via a narrowband physical downlink control channel (NPDCCH), wherein
   calculating an effective code rate of NPDCCH that is used in receiving downlink grant, resulting in a value $CR_{NPDCCH}$,
   calculating a scheduled code rate of NPDSCH or NPUSCH, resulting in a value $CR_{NPDSCH}$ or $CR_{NPUSCH}$,
   calculating a ratio between the effective code rate $CR_{NPDCCH}$ and the scheduled code rate $CR_{NPDSCH}$ or $CR_{NPUSCH}$, resulting in a result x,
   comparing the result x with pre-defined upper and lower bounds,
   dropping and not processing further the result x as false positive detection if the result x violates the pre-defined bounds.

2. The method according to claim 1, wherein the effective code rate inherently represents channel conditions between the UE and the base station and is determined by $CR_{NPDCCH}=N_I/(R*N)$, where $N_I$=23 or 24 bits and N is the number of code bits mapped to a single subframe and R is the number of repetitions of a resource mapped subframe.

3. The method according to claim 2, wherein the effective code rate of NPDCCH to successfully decode a NPDCCH transmission inherently represents the channel conditions between the UE and the base station.

4. The method according to claim 1, wherein the scheduled code rate of NPDSCH is indicated by DCI and is determined by $CR_{NPDSCH}=N_I/(N*N_{SF}*N_{Rep})$, where $N_I$ represents a transport block size NPDSCH given by modulation and coding scheme extracted from aDCI payload, N is the number of code bits mapped to a single subframe, $N_{SF}$ represents the number of subframes that the code word is rate-mapped to and $N_{Rep}$ represents the number of repetitions of the rate-mapped number of subframes.

5. The method according to claim 4, wherein the scheduled code rate of NPDSCH indicated by the DCI carried in a received NPDCCH are adjusted to current channel conditions which are checked based on information given in the DCI.

6. The method according to claim 1, wherein the scheduled code rate of NPUSCH is indicated by DCI and is determined by $CR_{NPUSCH}=N_I/(N*N_{RU}*N_{Rep})$, where $N_I$ represents a transport block size NPUSCH given by modulation and coding scheme extracted from a DCI payload, N is the number of code bits mapped to a resource unit, $N_{SF}$ represents the number of resource units that the code word is rate-mapped to and $N_{Rep}$ represents the number of repetitions of the rate-mapped number of resource units.

7. The method according to claim 6, wherein the scheduled code rate of NPUSCH indicated by the DCI carried in a received NPDCCH are adjusted to current channel conditions which are checked based on information given in the DCI.

8. The method according to claim 1, wherein the upper bound is defined by an adjusted and optimized value based on field experience.

9. The method according to claim 1, wherein the lower bound is defined by an adjusted and optimized value based on field experience.

10. The method according to claim 1, wherein the DCI is a NPDCCH payload and carries configuration parameters of NPDSCH or NPUSCH.

11. The method according to claim 10, wherein the configuration parameters of NPDSCH or NPUSCH comprise a modulation scheme, a coding scheme, resource assignment and a repetition number.

12. The method according to claim 1, wherein the DCI is a NPDCCH payload that is 23 or 24 bits long and carries configuration parameters of NPDSCH or NPUSCH.

13. The method according to claim 12, wherein the configuration parameters of NPDSCH or NPUSCH comprise a modulation scheme, a coding scheme, resource assignment and a repetition number.

14. The method according to claim 1, wherein the upper and lower bounds are refined by self-learning of the UE on field.

15. The method according to claim 14, wherein the upper and lower bounds are set to 400% and 25% of a nominal code rate.

16. The method according to claim 14, wherein the UE starts from a state where a first number of false positive grants are rejected and once the grants are verified to be correct via a positive cyclic redundancy check (CRC) result after NPDSCH reception, parametrization of the grants is used to refine the bounds such that a second number of false positive grants are rejected subsequently, wherein the second number is larger than the first number.

17. The method according to claim 1, wherein a code rate of subsequent NPDSCH or NPUSCH is derived by the UE from information presented within the DCI, and a processing order of NPDSCH in a transmitter of the UE is the same as for NPDCCH.

18. The method according to claim 1, wherein a 16-bit CRC checksum is calculated and attached to a transport block with payload bits, resulting in a bit sequence $\{c_i\}$ with $\{c_0 \ldots c_{38}\}=\{b_0 \ldots b_{22}, crc_0 \ldots crc_{15}\}$, wherein $b_i$ represents the payload bits of the transport block and $crc_i$ represents the attached CRC checksum; wherein the bit sequence $\{c_i\}$ is convolutional encoded by tail-biting, resulting in a second bit sequence $\{e_i\}$ with $\{e_0 \ldots e_{116}\}$, and the second bit sequence is rate matched to the size of a single subframe, scrambled, Quadrature Phase Shift Keying (QPSK) mapped and resource mapped.

19. The method according to claim 1, wherein the method is used in a 3rd generation partnership project(3GPP) system involving resource allocation by a base station with a blind decoding in a UE with limited CRC bits.

20. The method according to claim 19, wherein the 3GPP system is NB-IoT, Cat-M or long-term evolution(LTE).

* * * * *